(12) United States Patent
Freeman et al.

(10) Patent No.: US 9,827,503 B2
(45) Date of Patent: Nov. 28, 2017

(54) RESTRAINT SYSTEM FOR AMUSEMENT RIDE

(71) Applicant: Lagoon Corporation, Inc., Farmington, UT (US)

(72) Inventors: Dal Freeman, Farmington, UT (US); Aaron Jarrett, Farmington, UT (US); Dustin Allen, Farmington, UT (US)

(73) Assignee: Lagoon Corporation, Inc., Farmington, UT (US)

( * ) Notice: Subject to any disclaimer, the term of this patent is extended or adjusted under 35 U.S.C. 154(b) by 0 days.

(21) Appl. No.: 14/690,333

(22) Filed: Apr. 17, 2015

(65) Prior Publication Data

US 2016/0303482 A1 Oct. 20, 2016

(51) Int. Cl.
*B60R 21/00* (2006.01)
*A63G 7/00* (2006.01)

(52) U.S. Cl.
CPC ................ *A63G 7/00* (2013.01); *B60R 21/00* (2013.01); *B60R 2021/0097* (2013.01)

(58) Field of Classification Search
CPC .... B60R 2021/0097; B60R 2021/0213; B60R 22/22
See application file for complete search history.

(56) References Cited

U.S. PATENT DOCUMENTS

| | | | |
|---|---|---|---|
| 69,430 A | 10/1867 | Heesen | |
| 821,388 A | 5/1906 | Unger | |
| 1,499,166 A | 6/1924 | Fraizer | |
| 1,735,921 A | 11/1929 | Franzosa | |
| 2,165,698 A | 7/1939 | Eyerly | |
| 2,380,102 A | 7/1945 | Farmer | |
| D173,828 S | 1/1955 | Ziebell | |
| 2,970,638 A | 2/1961 | Halter | |
| 3,287,064 A | 11/1966 | Freeman | |

(Continued)

FOREIGN PATENT DOCUMENTS

| CN | 1468130 | 1/2004 |
|---|---|---|
| DE | 699 18 047 | 7/2005 |

(Continued)

OTHER PUBLICATIONS

European Search Report for European Patent Application No. 16161422.7 dated Sep. 9 2016, 7 pages.

*Primary Examiner* — Philip Gabler
(74) *Attorney, Agent, or Firm* — Thorpe North & Western, LLP (57) ABSTRACT

An amusement ride restraint system includes an amusement ride car. A lap pad is configured to selectively engage a lap of the rider while the rider is positioned within the seat. A first linkage is pivotally coupled to the lap pad and pivotally coupled relative to the floor of the ride car, the first linkage operable to rotate the lap pad into i) an engaged position in which the rider is restrained in the seat, and ii) a loading position in which the rider can be loaded into or unloaded from the seat. The lap pad is constrained to pivotal motion relative to the first linkage such that the lap pad is oriented in a substantially vertical attitude relative to the seat when moved into the loading position and is oriented in a substantially horizontal attitude relative to the seat when moved into the engaged position.

20 Claims, 5 Drawing Sheets

(56) References Cited

U.S. PATENT DOCUMENTS

| | | | |
|---|---|---|---|
| 3,393,010 A * | 7/1968 | Steinberg | B60R 21/02 280/748 |
| 3,713,696 A | 1/1973 | Dudley | |
| 3,845,892 A | 11/1974 | Bernhardt, Jr. | |
| 3,881,744 A * | 5/1975 | Tupper | B60R 21/02 280/751 |
| 3,888,329 A * | 6/1975 | Monaghan | B60R 21/02 280/734 |
| 3,890,004 A | 6/1975 | Rail | |
| 4,039,225 A | 8/1977 | Tomforde | |
| 4,054,319 A | 10/1977 | Fogg, Jr. et al. | |
| 4,082,350 A | 4/1978 | Tomforde | |
| 4,119,164 A | 10/1978 | Fogg, Jr. et al. | |
| 4,161,337 A | 7/1979 | Ross et al. | |
| 4,295,683 A | 10/1981 | Dubbink et al. | |
| 4,300,249 A | 11/1981 | Taylor | |
| 4,580,842 A | 4/1986 | Segal | |
| 4,653,809 A | 3/1987 | Czernakowski et al. | |
| 4,765,685 A | 8/1988 | Sudoh et al. | |
| D301,091 S | 5/1989 | Kimball | |
| 4,913,498 A | 4/1990 | Forlivio | |
| 4,960,304 A | 10/1990 | Frantz | |
| D321,613 S | 11/1991 | Gandy | |
| 5,076,643 A | 12/1991 | Colasanti et al. | |
| 5,100,199 A | 3/1992 | Vander Stel et al. | |
| 5,238,265 A * | 8/1993 | Duce | B60R 21/02 280/751 |
| 5,248,182 A | 9/1993 | Hittie | |
| 5,275,464 A | 1/1994 | Eichhorn et al. | |
| 5,529,382 A * | 6/1996 | Burkat | A63G 7/00 280/748 |
| 5,722,725 A | 3/1998 | McNaughton | |
| 6,079,783 A | 6/2000 | Schuster, Sr. et al. | |
| 6,079,785 A | 6/2000 | Peterson et al. | |
| 6,287,211 B1 | 9/2001 | Bolliger et al. | |
| 6,315,363 B1 | 11/2001 | Frear | |
| 6,513,441 B1 | 2/2003 | Clerx et al. | |
| 6,626,492 B1 | 9/2003 | Uno | |
| 6,637,341 B2 | 10/2003 | Kroon et al. | |
| 7,204,559 B2 | 4/2007 | Berra | |
| 7,261,381 B2 | 8/2007 | Tsai | |
| 7,393,054 B2 | 7/2008 | McQueen et al. | |
| 7,677,671 B2 * | 3/2010 | Steininger | A63G 7/00 297/487 |
| 7,770,522 B2 | 8/2010 | Muller et al. | |
| 8,132,514 B2 | 3/2012 | Lubman et al. | |
| 8,845,025 B2 | 9/2014 | Kurata et al. | |
| 2002/0070599 A1 | 6/2002 | Berra | |
| 2004/0012239 A1 | 1/2004 | Lewis | |
| 2008/0143158 A1 | 6/2008 | Roodenburg et al. | |
| 2008/0179937 A1 | 7/2008 | Steininger et al. | |
| 2016/0114750 A1 * | 4/2016 | Howard | B60R 21/02 297/466 |

FOREIGN PATENT DOCUMENTS

| | | |
|---|---|---|
| DE | 20 2007 001 485 | 3/2007 |
| FR | 1008155 | 5/1952 |
| GB | 1432592 | 4/1976 |
| GB | 2 149 313 | 6/1985 |
| WO | WO 9727904 | 8/1997 |
| WO | WO 9922830 | 5/1999 |

* cited by examiner

RESTRAINT SYSTEM FOR AMUSEMENT RIDE

BACKGROUND OF THE INVENTION

Field of the Invention

The present invention relates generally to rider restraint systems for amusement rides. More particularly, the present invention relates to lap bar restraints that move into position onto or over a rider's lap to restrain the rider while the rider is positioned on or against a rider support during the ride.

Related Art

Amusement rides, such as roller coasters and the like, have been enjoyed by enthusiasts for many years. As technology and consumer appetite for more aggressive rides have progressed, modern amusement rides are highly engineered experiences that subject riders to considerable speeds and forces. Such increases have driven the need for increasingly robust restraint systems that secure riders in place for the duration of the amusement ride. Restraint systems serve at least two purposes: they prevent riders from accidentally moving from the position in which they are intended to ride, and they prevent careless or reckless riders from intentionally circumventing the safety restraint.

While modern engineers are capable of designing restraint systems that nearly perfectly restrain any sized rider, there exist design considerations that affect the feasibility of complete restraint. Among these are space and weight considerations: small and lightweight restraint designs are desirable. Speed of loading and unloading passengers is also a factor: ride operators (and/or park owners) wish to load and unload riders from a ride as quickly as possible, to reduce rider wait time.

For at least these reasons, designers continue to seek rider restraint systems that securely restrain riders of many varying sizes, that can easily and quickly engage these riders of various sizes, and that do so in a size and weight efficient manner.

SUMMARY OF THE INVENTION

In accordance with one aspect of the invention, an amusement ride restraint system is provided, including an amusement ride car having a seat configured to support a rider while on the amusement ride. A lap pad can be configured to selectively engage the lap of the rider while the rider is positioned within the seat. A first linkage can be pivotally coupled to the lap pad and can be pivotally coupled relative to the floor of the ride car. The first linkage can be operable to rotate the lap pad into i) an engaged position in which the rider is restrained in the seat, and ii) a loading position in which the rider can be loaded into or unloaded from the seat. The lap pad is constrained to pivotal motion relative to the first linkage such that the lap pad is oriented in a substantially vertical attitude relative to the seat when moved into the loading position and is oriented in a substantially horizontal attitude relative to the seat when moved into the engaged position.

In accordance with another aspect, a restraint system for use with a rail car is provided, including a restraint pad, operable to engage a rider to restrain the rider in the rail car. A first linkage can be pivotally coupled to the restraint pad and can be pivotally moveable relative to a floor of the rail car. A second linkage can be pivotally coupled to the restraint pad and can be pivotally moveable relative to the floor of the rail car. The first and second linkages can cooperatively control an angle of the restraint pad as the restraint pad moves in an arc relative to the floor of the rail car to cause the restraint pad to rotate into a relatively vertical attitude when moved away from the floor of the rail car and to rotate into a relatively horizontal attitude when the restraint pad is moved toward the floor of the rail car.

In accordance with another aspect of the invention, a method of restraining a rider in a seat of an amusement ride car is provided, including: positioning a rider in a seat of the ride car; and moving a lap pad from a loading position in which the lap pad is positioned in a substantially vertical attitude relative to the seat to an engaged position in a substantially horizontal attitude relative to the seat to thereby engage thighs (or abdomen or torso) of the rider with the lap pad to restrain the rider within the seat of the ride car.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

DEFINITIONS

As used herein, the singular forms "a" and "the" can include plural referents unless the context clearly dictates otherwise. Thus, for example, reference to "a linkage" can include one or more of such linkages, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms are sometimes used herein to describe and claim various components of the ride systems of the present invention. Such terms include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art.

For example, the terms "horizontal" and "vertical" are used extensively herein to refer to relative orientations of a lap pad restraint. One of ordinary skill in the art will appreciate that the ride cars of the present invention may experience a wide range of orientations during operation of an amusement ride. The terms "horizontal" and "vertical" are intended to describe orientations of various features relative to a resting position of the ride, typically on a nominally flat rail. Such an orientation is generally used when loading and unloading passengers or riders from the ride cars, for example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to restraint systems for use in rail car rides. While the present technology can be utilized in a variety of applications, including general transit systems, aircraft and the like, the present inventors have found it particularly well adapted for use in amusement rides. Conventional amusement rides, such as high-speed coasters, subject riders to considerable forces during operation. Due to this, the riders must be well restrained in a desired position within a rider support, such as a seat. Many systems have proved problematic in the limited space requirements of modern amusement rides; limiting access for loading or unloading or causing burdens on the vehicle design. Such limitations in design and access are poorly received by park owners and operators.

In addition, such systems have not proven to effectively account for varying rider size and shape. Due to this, unusually large or small riders are either not properly restrained, or special accommodations must be made for such riders, or they are not allowed to ride at all. Any such deviation from normal loading or unloading procedures can increase load and unload time, and thus rider wait time. These are issues that responsible park owners and ride operators universally wish to avoid.

The present technology provides systems and methods for quickly loading and unloading riders while providing an effective restraint system for riders of a wide range of size and shape. The system can automatically adjust an angle at which a lap pad engages riders that are both smaller and larger than the typical rider, based on the rider's size. The engagement process can be done in the same amount of time required for a typical rider.

Figure 1:
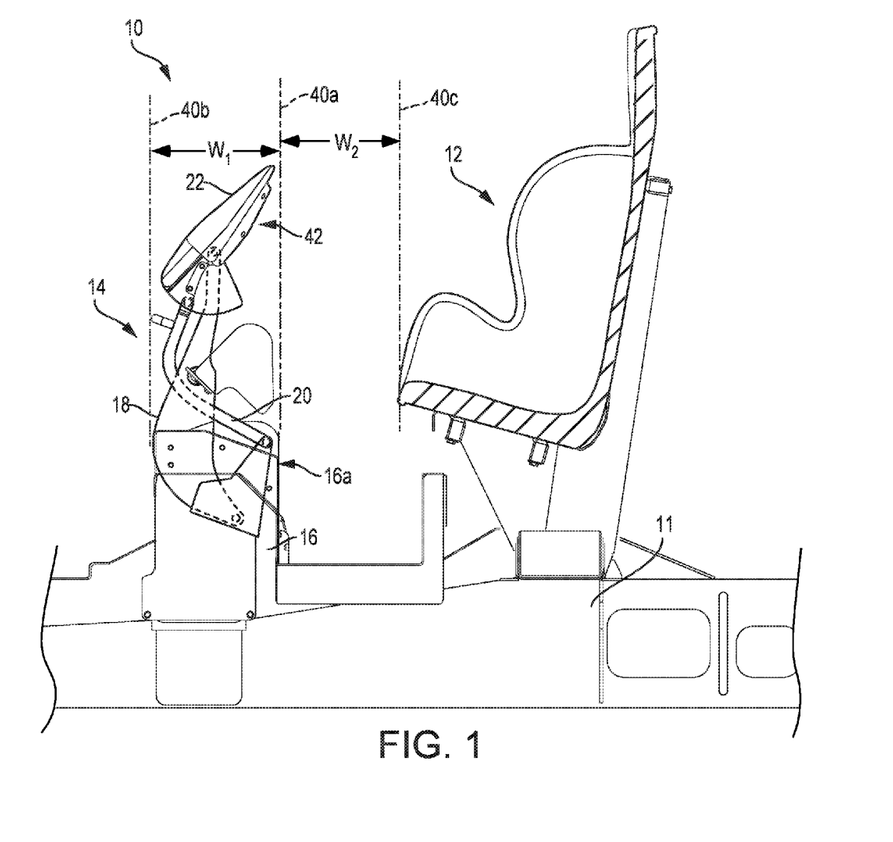
FIG. 1 is a side view of a ride car including a rider seat and a restraint bar movement assembly, with the seat shown sectioned through section A-A of FIG. 4A.

Turning now to the figures, FIG. 1 generally illustrates at 10 the features of the technology. A portion of a rail car is shown at 11. The rail car can take a variety of forms, but is generally adapted to be propelled on a rail, track or similar structure. The manner by which the rail car is propelled, and the type of system with which the rail car is used, will not be described in detail herein. One of ordinary skill in the art, having possession of this disclosure, will readily understand the workings of such systems. As that term is used herein, the rail car 11 can either be a stand-alone unit which is itself attached to some carrier that rides on a rail system, or the rail car can form an integral part of the rail system. Generally speaking, however, the seat and the overall restraint system are fixed to the rail car structure, and are fixed in position relative to one another.

A rider support 12 can be coupled to the rail car and can be configured to support a rider while the rider is carried on the amusement ride. In the examples shown, the rider support 12 comprises a seat: however, other rider supports can be utilized, including those suitable for supporting a rider while in a prone position, a standing position, a position suitable for riding a bicycle or motorcycle, etc. A restraint bar movement assembly 14 can also be coupled to or carried by the rail car. The restraint bar movement assembly can generally include a base 16 to which one or more linkages are pivotally coupled. In the example shown, two linkages 18, 20 are shown. As discussed in more detail below, the linkages cooperate to move a restraint pad, or lap pad, 22 into position to restrain a rider in the rider support or seat 12. As the lap pad is moved into a restraint position, an angle of the lap pad is carefully controlled, as is a translational position of the lap pad, to provide a number of advantages.

Figure 2:
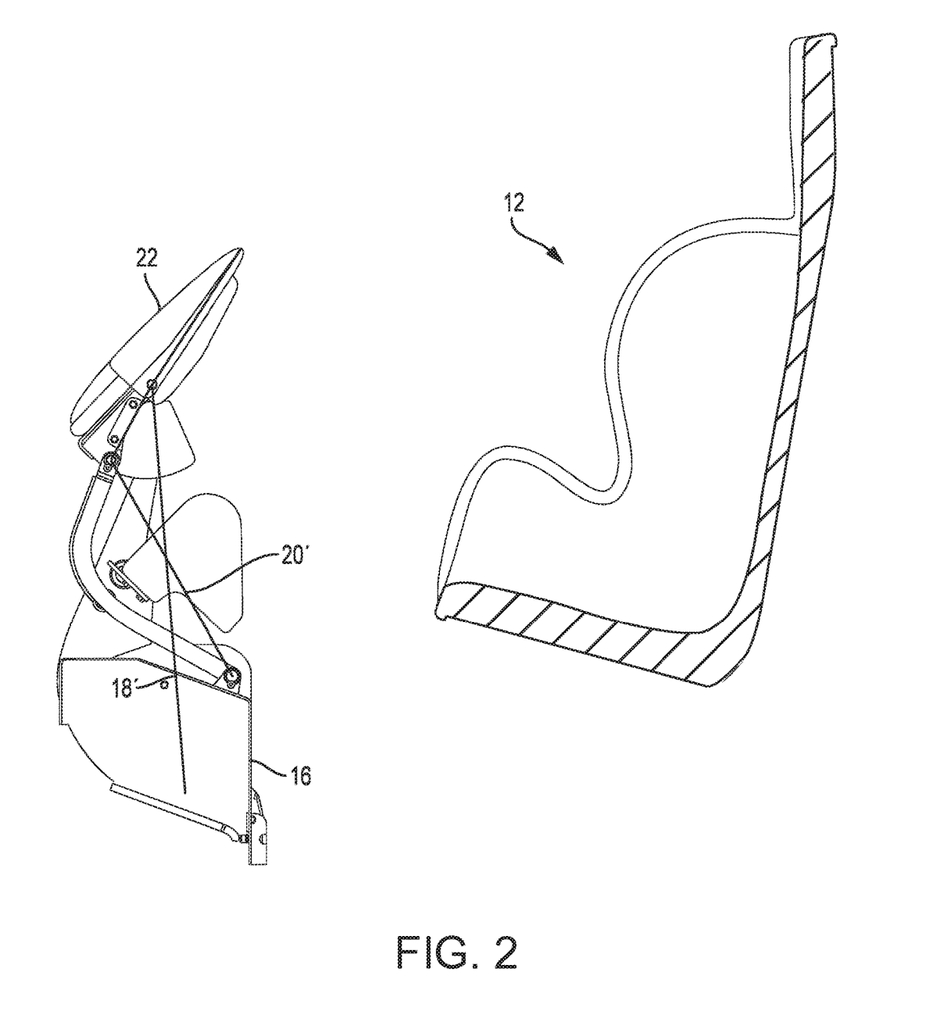
FIG. 2 is side view of the rider seat and restraint bar movement assembly of FIG. 1, with exemplary modeling linkages shown.

FIG. 2 illustrates exemplary modeling linkages 18', 20' that can be used to generally illustrate the concepts of rotating the lap pad 22 into various orientations or attitudes. While specific examples of such linkages 18, 20 are shown in FIG. 1, it is to be understood that a variety of differing configurations can be utilized to achieve the same rotating lap pad orientation desired. For example, linkages with shapes differing from those shown can be used. The number or linkages can vary, as can the relationship between the linkages, points of attachment to the various structure, points of rotation, etc.

Generally speaking, however, the linkages 18, 18', 20, 20', etc., can be rotatably coupled to the base 16, which is fixed relative to the rail car 11. Lap pad 22 can be rotatably coupled to the linkages. Thus, as best seen in FIG. 3, as the linkages are rotated relative to the base, the lap pad is both moved through an arc toward or away from the seat 12, and is also rotated relative to the seat.

Figure 3:
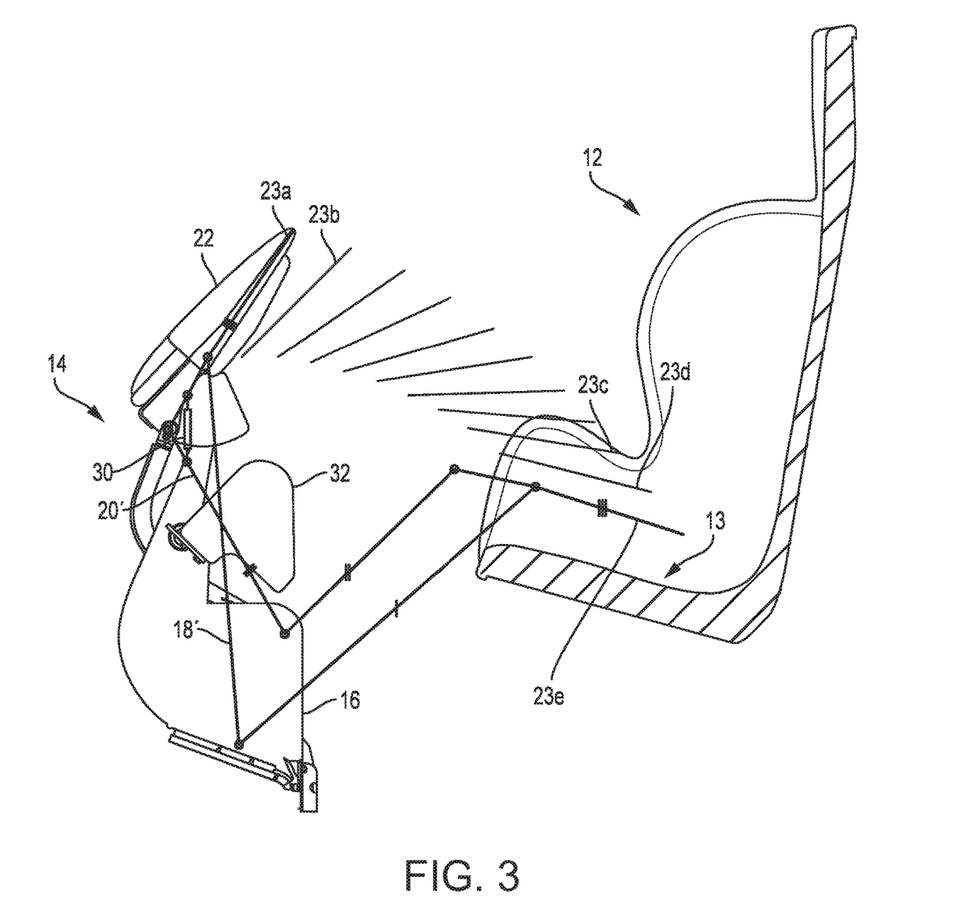
FIG. 3 is a side view of the rider seat and restraint bar movement assembly of FIG. 1, shown with a lap pad moving through a series of positions from an upright, loading position to a downward, engaged position.

In the leftmost position of FIG. 3, the lap pad 22 is shown in a substantially vertical, loading orientation in which riders can be loaded into or out of the seat 12. Incremental lines 23a, 23b, 23c, 23d, 23e, etc., depict the change in angle or attitude of the lap pad as it is moved from the loading position (shown at 23a) to a substantially horizontal, restraint or engaged position 23d. It will thus be appreciated that the lap pad is moved through a successively increasing angle, relative to the seat, as the lap pad is moved from the engaged or restraint position (shown at 23c, 23d or 23e, for example) to the loading position (shown at 23a). In this manner, the angle at which the lap pad 22 engages a rider's thighs, abdomen, or torso is automatically adjustable to account for the size of the rider. In addition, as the angle of the lap pad is adjusted, the translational position of the lap pad is adjusted: that is, as the lap pad moves from the restraint position to the loading position, the angle of the lap pad is increased and the lap pad is moved further from the rider's lap, abdomen or torso.

For example, in the engaged or restraint position shown at 23d, the lap pad 22 is substantially parallel with a surface 13 of the seat 12 on which the backs of a rider's legs and buttocks rest while in the seat. This position of the lap pad can be used for most riders of normal size. However, if the rider is a small child or elderly person, his or her legs and overall stature may be much smaller than the normal rider. In this case, the lap pad can be moved into position 23e, which is closer to the seat translationally, and has less elevation relative to the seat surface 13, and has an attitude with a smaller angle relative to the seat. All of these components aid in more securely restraining a person of smaller stature within the seat.

The angle of the lap pad 22 is discussed herein in relation to various components of the rider support or seat 12. As the seat is generally fixed relative to the restraint bar movement assembly 14, changing an angle of lap pad relative to any component of the seat will generally change the angle of the lap pad relative to any other component of the seat. In some specific examples, however, the angle of the restraint pad or lap pad is referenced relative to the seat surface (13 in FIG. 3).

Movement of the various components of the restraint bar movement assembly 14 can be accomplished in a variety of manners, as will be appreciated by one of ordinary skill in the art having possession of this disclosure. The lap pad 22 can be moved into position automatically, by hydraulics, pneumatics, etc., or it can be moved into position by the rider or a ride operator. Typically, however, the lap pad is rigidly fixed in the restraint or engaged position prior to the ride beginning.

In the opposite case, when a rider of greater stature than is normal is riding the ride, the lap pad 22 can be moved into the position indicated at 23c. In this position, the lap pad is translationally further from the rear of the seat 12, is held higher above the seat surface 13, and is oriented at a greater angle relative to the seat.

It will thus be appreciated that the present technology can securely restrain riders of varying build within the seat 12, and can do so without requiring a ride attendant to make special accommodations for such people. In addition, the present technology can do so in the same amount of time required for the so-called normal rider. No additional structure need be added to the ride.

The present inventors have found the angled trajectory of the lap pad as it moves into the restraint or engaged position naturally engages riders of varying stature due to the size and shape of their legs. Generally speaking, those with smaller stature will have thinner legs, from the knee to the hip area. As such, the "flatter" angle of engaged position 23e works well for these people. Riders with larger stature will generally have legs that taper outwardly (upwardly, viewed from the side in FIG. 3) from the knee to the hip. In this case, the more open angle of engaged position 23c will properly engage the thighs of such riders and retain them in position without causing undue discomfort to such riders. Thus, the present system can alter the angle at which the lap pad engages a rider's thighs based upon the size of the rider's thigh. The movement arc of the lap pad will also position the lap pad closer to the rider's abdomen, torso, etc., as the angle of the lap is decreased for smaller riders, as compared to larger riders.

While two linkages 18, 20 are shown in use in the figures, it is to be understood that the change in angle of the lap pad 22 can be achieved in a variety of manners. For example, an extendible arm 30 is shown in FIG. 3. Such an arm can be utilized with only a single linkage coupled to the base 16 and to the lap pad 22. The extendible arm can controllably alter the angle of the lap pad relative to the seat 12 as the single linkage rotates and moves the lap closer to, or further from, the seat 12. The extendible arm can be hydraulic, electric, pneumatic, mechanical, etc., and can be controlled through a variety of systems known to those of ordinary skill in the art.

Figure 4A:
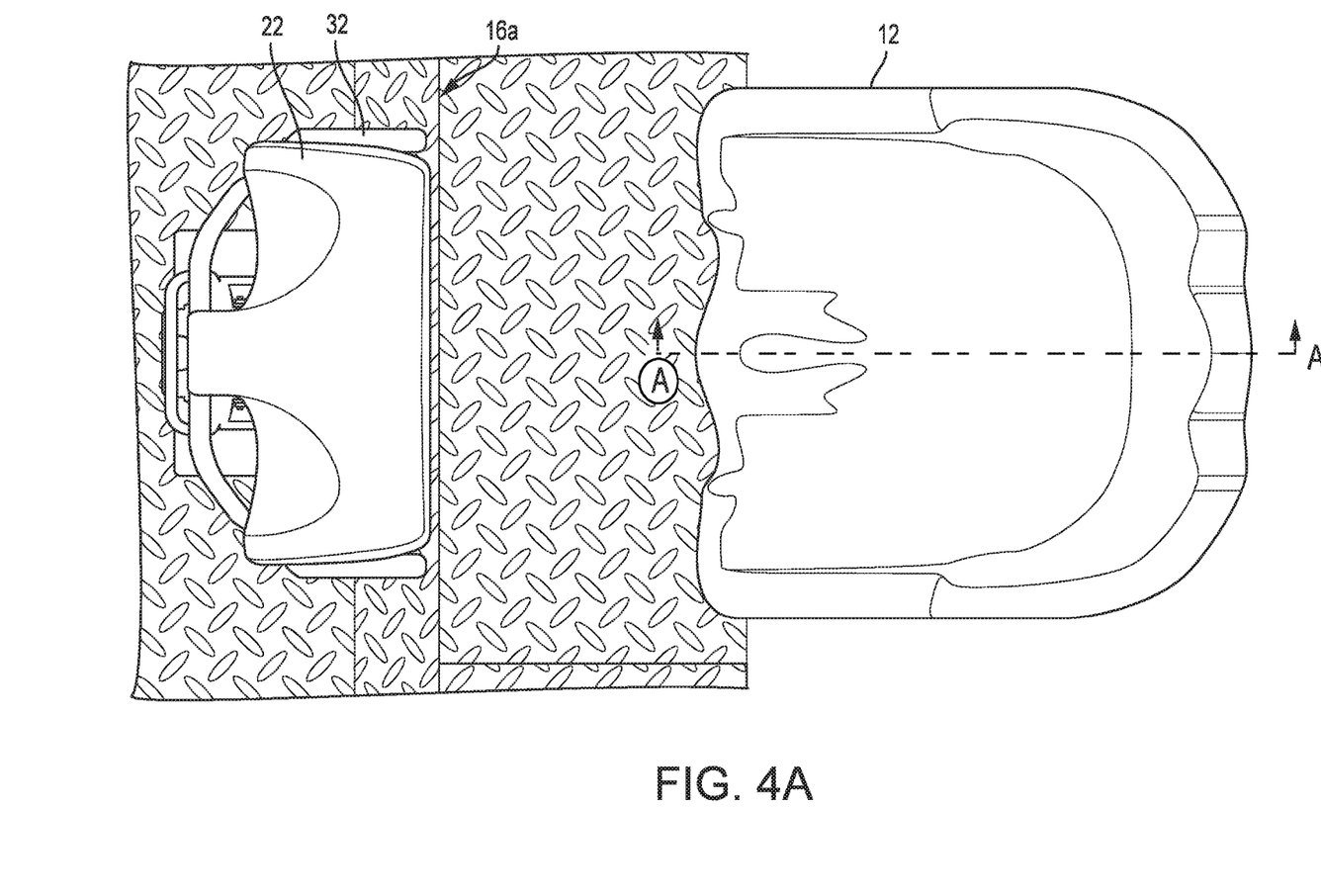
FIG. 4A is a top view of the rider seat and restraint bar movement assembly of FIG. 1, with the lap pad shown in an upright, loading position.
Figure 4B:
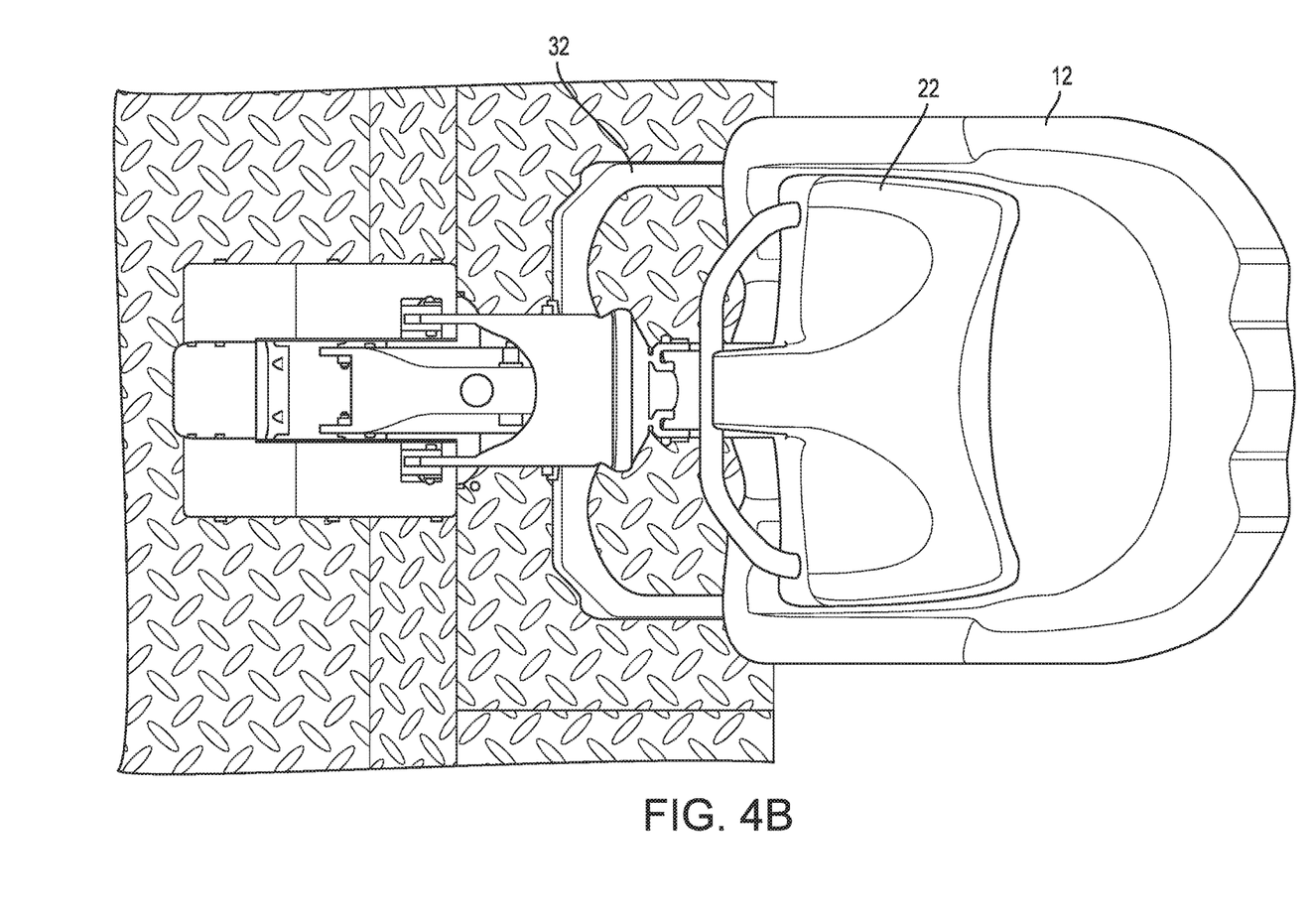
FIG. 4B is a top view of the rider seat and restraint bar movement assembly of FIG. 1, with the lap pad shown in a downward, engaged position.

As shown in FIGS. 3, 4A and 4B, the system can also include a knee pad 32 that can be operatively coupled to one or both of the linkages 18, 20. The knee pad can engage the rider's legs to aid in restraining the rider in position in the seat. The knee pad can be moved from an engaged position (shown in FIG. 4B for example) to a loading position (shown in FIGS. 3 and 4A, for example) as the lap pad 22 is moved from the engaged position to the loading position. The knee pad can similarly be positioned in varying attitudes through the arc of movement of the linkages.

As shown in FIG. 1, the base 16 of the restraint bar movement assembly 14 can include a rear edge 16a oriented toward the seat 12. In one aspect of the invention, an entirety of the lap pad 22 can be moved behind a vertical plane 40a of the rear edge of the base of the restraint bar movement assembly when the lap pad is moved to the loading position. In this manner, the restraint bar movement assembly can occupy a very small footprint when in the loading position. This allows riders to be more easily loaded and unloaded from the rail car, and also allows successive seat and restraint pairs to be more densely packed in a rail assembly. When in this fully retracted, loading position, a bottom face 42 of the lap pad can be exposed to a rider. The same bottom face will contact the rider's thighs when in the engaged position.

In one aspect, the moving components that comprise the restraint bar movement assembly 14 can retract into a very compact configuration when in the loading position. As shown in FIG. 1, in one aspect, a vertical restraint window can be defined by the vertical planes 40a and 40b. When in the loading position, all of the various moveable components of the restraint bar movement assembly can fit within the bounds of this vertical restraint window. That is, all of the moveable components are rearward of vertical plane 40b and forward of vertical plane 40a. The size of the vertical window can vary, but in one aspect, it is smaller in width "$W_1$" than about 14.0 inches. In one aspect, it is smaller in width than about 11.0 inches.

Also, a loading window can be defined between vertical plane 40a and a vertical plane 40c coinciding with the front edge of the seat 12. In one embodiment, this loading window can have a width "$W_2$" more than about 14.0 inches. In another embodiment, this loading window can have a width "$W_2$" more than about 11.5 inches.

By maximizing the width "$W_2$" of the loading window, riders can be given ample room while entering and leaving the ride car. By minimizing the width "$W_1$" of the restraint window, the overall footprint of the restraint assembly 14 and the seat 12 can be minimized, allowing more seats with restraint assemblies to be installed in a given length of ride car.

The lap pad 22 of the present technology can take a variety of forms. In one aspect, the lap pad includes a generally soft padding material that can comfortably engage a rider's thighs, and upon which a rider can comfortably rest his or her hands. The lap pad can include a generally rectangular shape that is rotatably or pivotally coupled to one or more linkages. Thus, the lap pad includes a substantive length, width and height independent of any of the linkages described. The lap pad is distinct from the linkages, as those terms are utilized herein, and is typically rotatably coupled to such linkages.

In addition to the structural components discussed above, the present invention also provides a method of restraining a rider in a seat of an amusement ride car. The method can include positioning a rider in a seat of the ride car, and moving a lap pad from a loading position in which the lap pad is positioned in a substantially vertical attitude relative to the seat to an engaged position in a substantially horizontal attitude relative to the seat to thereby engage thighs of the rider with the lap pad to restrain the rider within the seat of the ride car.

In this method, the lap pad can be pivotally coupled to first and second linkages that are pivotally coupled relative to a floor of the ride car, the first and second linkages cooperating to rotate the lap pad relative to the seat of the ride car. The lap pad can be moved through a successively increasing angle, relative to the seat of the ride car, as the lap pad is moved from the engaged position to the loading position. A bottom face of the lap pad can be exposed to the rider when the lap pad is in the loading position, and can contact the rider's thighs when in the engaged position. Thus, an angle at which the lap pad engages the rider's thighs varies according to a size of the rider's legs: the angle at which the lap pad engages the rider's thighs is greater for riders having relatively thicker legs and is smaller for riders having relatively thinner legs.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

We claim:
1. An amusement ride restraint system, comprising:
an amusement ride car having a floor and a seat configured to support a rider while on the amusement ride;
a lap pad, configured to selectively engage a lap of the rider while the rider is positioned within the seat; and
first and second linkages, pivotally coupled to the lap pad and pivotally coupled relative to the floor of the ride car, the linkages being movable relative to the floor of the ride car such that the linkages successively position the lap pad between i) an engaged position in which the rider is restrained in the seat, and ii) a loading position, spatially distinct from the engaged position, in which the rider can be loaded into or unloaded from the seat;
a lateral and an angular position of the lap pad being controlled by the linkages between i) a substantially vertical attitude relative to the seat when moved into the loading position and ii) a substantially horizontal attitude relative to the seat when moved into the engaged position.

2. The system of claim 1, further comprising a restraint bar movement assembly to which the lap pad is coupled, the restraint bar movement assembly having a base with a rear edge oriented toward the seat, wherein an entirety of the lap pad is moved behind a vertical plane of the rear edge of the base of the restraint bar movement assembly when the lap pad is moved to the loading position.

3. The system of claim 2, wherein all moving components of the restraint bar movement assembly fall within a vertical window having a width of less than about 14.0 inches.

4. The system of claim 3, wherein the vertical window has a width of less than about 11.0 inches.

5. The system of claim 1, wherein the lap pad is controllably moved by the linkages through a successively increasing angle, relative to the seat, as the lap pad is moved from the engaged position to the loading position.

6. The system of claim 1, further comprising a knee pad operatively coupled to one of the linkages, the knee pad moving from an engaged position to a loading position as the lap pad is moved from the engaged position to the loading position.

7. The system of claim 1, wherein a bottom face of the lap pad is exposed to a rider when the lap pad is in the loading position and contacts the rider's thighs when in the engaged position.

8. The system of claim 1, wherein an angle, relative to the seat, at which the lap pad engages a rider's thighs varies according to a size of the rider's legs.

9. The system of claim 8, wherein the angle at which the lap pad engages the rider's thighs is greater for riders having relatively thicker legs and is smaller for riders having relatively thinner legs.

10. An amusement ride restraint system, comprising:
an amusement ride car having a floor and a seat configured to support a rider while on the amusement ride;
a lap pad, configured to selectively engage a lap of the rider while the rider is positioned within the seat; and
first and second linkages, pivotally coupled to the lap pad and pivotally coupled relative to the floor of the ride car, the linkages being movable relative to the floor of the ride car to and between i) an engaged position, and ii) a loading position;

the lap pad being fixed in: i) a substantially vertical attitude relative to the seat when the linkages are moved into the loading position and ii) a substantially horizontal attitude relative to the seat when the linkages are moved into the engaged position, and iii) a series of successively increasing angles relative to the seat between the substantially horizontal attitude and the substantially vertical attitude as the linkages move between the loading position and the engaged position.

11. The system of claim 10, further comprising a restraint bar movement assembly to which the lap pad is coupled, the restraint bar movement assembly having a base with a rear edge oriented toward the seat, wherein an entirety of the lap pad is moved behind a vertical plane of the rear edge of the base of the restraint bar movement assembly when the lap pad is moved to the loading position.

12. The system of claim 10, wherein a bottom face of the lap pad is exposed to a rider when the lap pad is in the loading position and contacts the rider's thighs when in the engaged position.

13. The system of claim 10, wherein an angle, relative to the seat, at which the lap pad engages a rider's thighs varies according to a size of the rider's legs.

14. The system of claim 13, wherein the angle at which the lap pad engages the rider's thighs is greater for riders having relatively thicker legs and is smaller for riders having relatively thinner legs.

15. The system of claim 10, wherein the loading position is spatially distinct from the engaged position.

16. The system of claim 10, wherein the loading position is laterally spaced from the engaged position.

17. An amusement ride restraint system, comprising:
an amusement ride car having a floor and a seat configured to support a rider while on the amusement ride;
a lap pad, configured to selectively engage a lap of the rider while the rider is positioned within the seat; and
a first linkage, pivotally coupled to the lap pad and pivotally coupled relative to the floor of the ride car, the first linkage controlling an angular position of the lap pad, the first linkage being movable relative to the floor of the ride car to thereby cause the lap pad to move into i) an engaged position in which the rider is restrained in the seat, and ii) a loading position, spatially distinct from the engaged position, in which the rider can be loaded into or unloaded from the seat;
angular position of the lap pad being constrained by the first linkage such that the lap pad is moved by the linkage into: i) a substantially vertical attitude relative to the seat when moved into the loading position and ii) a substantially horizontal attitude relative to the seat when moved into the engaged position.

18. The system of claim 17, further comprising a second linkage, pivotally coupled to the lap pad and pivotally coupled relative to the floor of the ride car, the second linkage cooperating with the first linkage to control angular position of the lap pad.

19. The system of claim 17, wherein the lap pad is moved by the first linkage through a successively increasing angle, relative to the seat, as the lap pad is moved from the engaged position to the loading position.

20. The system of claim 17, wherein a bottom face of the lap pad is exposed to a rider when the lap pad is in the loading position and contacts the rider's thighs when in the engaged position.

* * * * *